US012346323B2

(12) United States Patent
Elizarov et al.

(10) Patent No.: US 12,346,323 B2
(45) Date of Patent: Jul. 1, 2025

(54) DYNAMIC SHARD ALLOCATION IN A NEAR REAL-TIME SEARCH PLATFORM

(71) Applicant: eBay Inc., San Jose, CA (US)

(72) Inventors: Yury Elizarov, Concord (CA); Khachatur Kocharayan, North York (CA)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 18/481,462

(22) Filed: Oct. 5, 2023

(65) Prior Publication Data
US 2025/0117384 A1 Apr. 10, 2025

(51) Int. Cl.
G06F 16/00 (2019.01)
G06F 16/2453 (2019.01)
G06F 16/2458 (2019.01)

(52) U.S. Cl.
CPC .... *G06F 16/24542* (2019.01); *G06F 16/2471* (2019.01)

(58) Field of Classification Search
None
See application file for complete search history.

(56) References Cited

U.S. PATENT DOCUMENTS

| 2016/0004571 | A1 | 1/2016 | Smith |
| 2016/0011901 | A1 | 1/2016 | Hurwitz et al. |
| 2016/0085839 | A1 | 3/2016 | D'Halluin et al. |
| 2016/0203168 | A1 | 7/2016 | Gangadharappa et al. |
| 2017/0344618 | A1* | 11/2017 | Horowitz ............... G06F 16/27 |
| 2018/0096045 | A1 | 4/2018 | Merriman et al. |
| 2021/0344750 | A1 | 11/2021 | Welsch et al. |
| 2023/0080545 | A1 | 3/2023 | Cella et al. |

FOREIGN PATENT DOCUMENTS

| CN | 103631922 A | * 3/2014 | .......... G06F 16/951 |
| CN | 107566531 B | 7/2020 | |
| CN | 113568749 A | 10/2021 | |
| CN | 119781951 A | 4/2025 | |
| EP | 4538903 A1 | 4/2025 | |

OTHER PUBLICATIONS

"ILM: Manage the index lifecycle", elastic, Elasticsearch Guide [retrieved Nov. 21, 2023]. Retrieved from the Internet <https://www.elastic.co/guide/en/elasticsearch/reference/current/index-lifecycle-management.html>, 4 pages.

(Continued)

*Primary Examiner* — Tuankhanh D Phan
(74) *Attorney, Agent, or Firm* — FIG. 1 Patents

(57) ABSTRACT

Dynamic shard allocation in a near real-time search platform is described. A computing system may include a cluster comprising a plurality of nodes, each node of the plurality of nodes comprising a plurality of shards storing searchable data. A query load distribution of the cluster is assessed in real-time. A first shard of a first node and a second shard of a second node are identified based on the query load distribution. The first shard of the first node is commanded to exchange with the second shard of the second node.

20 Claims, 7 Drawing Sheets

(56) References Cited

OTHER PUBLICATIONS

Nagy, Attila, "Load-driven Shard Distribution in Elasticsearch—Story of an Internship", Under the Hood, the official meltwater engineering blog [retrieved Jul. 12, 2023]. Retrieved from the Internet <https://underthehood.meltwater.com/blog/2019/09/27/load-driven-shard-distribution-in-elasticsearch-story-of-an-internship/>, Sep. 27, 2019, 8 pages.
Opster Team, "Elasticsearch Shard Allocation is Unbalanced", Opster Blog [retrieved Nov. 21, 2023]. Retrieved from the Internet <https://opster.com/guides/elasticsearch/capacity-planning/elasticsearch-shard-allocation-is-unbalanced/>, Mar. 22, 2023, 9 pages.
Wang, Pei, "Elasticsearch Performance Tuning Practice at eBay", ebay Tech Blog [retrieved Jun. 28, 2023]. Retrieved from the Internet <https://innovation.ebayinc.com/tech/engineering/elasticsearch-performance-tuning-practice-at-ebay/>, Jan. 8, 2018, 14 pages.
"EP Search Report", EP Application No. 24200748.2, Mar. 18, 2025, 9 pages.
Lee, et al., "Shard Manager: A Generic Shard Management Framework for Geo-distributed Applications", SOSP '21, Virtual Event, Germany, ACM ISBN, Oct. 2021, 17 pages.

* cited by examiner

DYNAMIC SHARD ALLOCATION IN A NEAR REAL-TIME SEARCH PLATFORM

BACKGROUND

Distributed data storage and retrieval systems include near real-time (NRT) search platforms that enable large volumes of data to be stored, searched, and analyzed substantially at the time the data are generated. By way of example, the NRT search platform may employ a distributed architecture where data are divided into smaller units called shards, and these shards are distributed across multiple nodes within a cluster to enhance performance, scalability, and fault tolerance. Shard balancing may be used to achieve a relatively even distribution of data and query loads across the nodes in the cluster in order to maintain efficient performance and resource utilization in the cluster. Effective shard balancing enhances search performance and response times, reduces or prevents node overloading, and ensures efficient resource utilization.

SUMMARY

Dynamic shard allocation in a near real-time search platform is described. A computing system may include a cluster comprising a plurality of nodes, each node of the plurality of nodes comprising a plurality of shards storing searchable data. A query load distribution of the cluster is assessed in real-time. A first shard of a first node and a second shard of a second node are identified based on the query load distribution. The first shard of the first node is commanded to exchange with the second shard of the second node.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
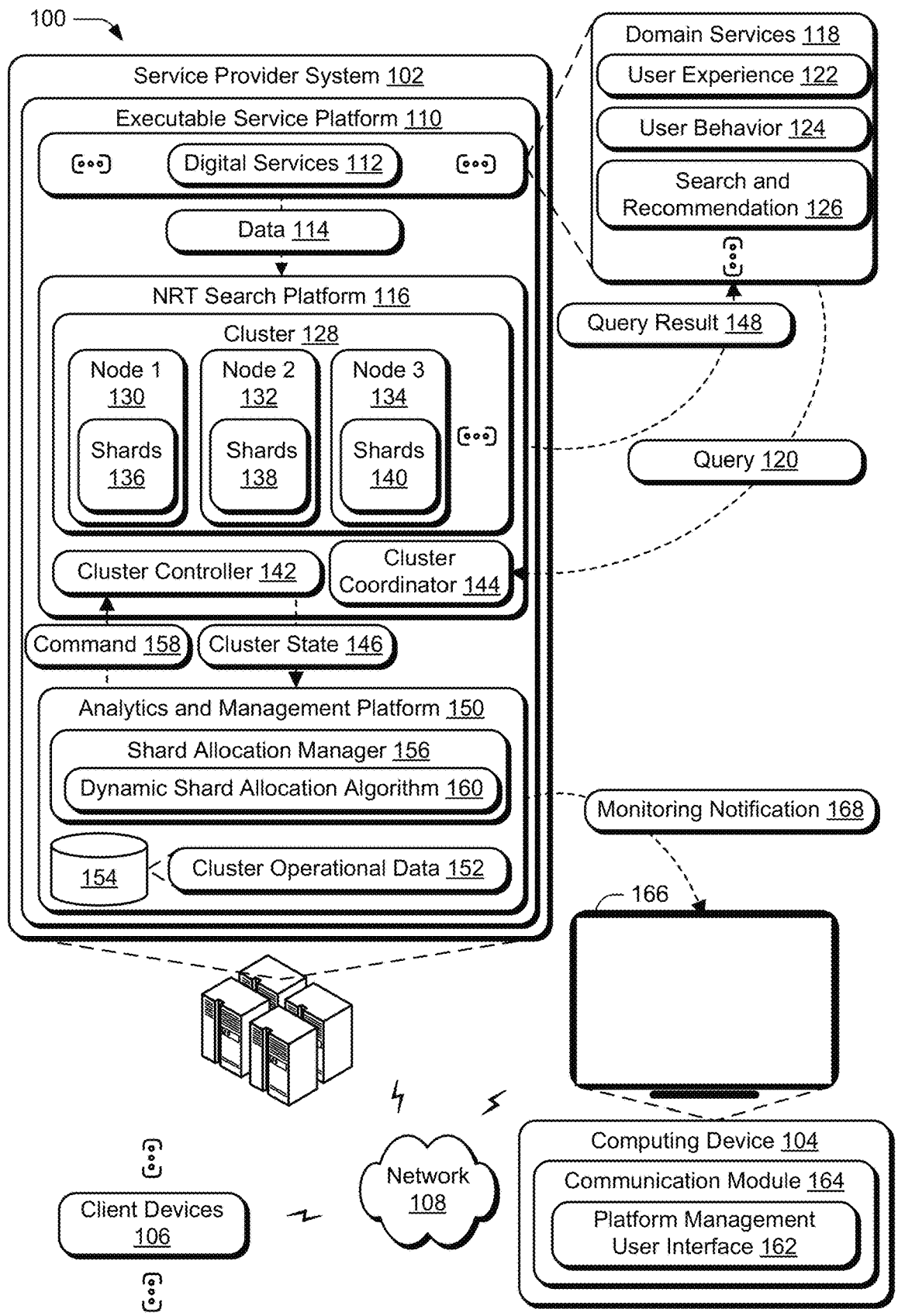
FIG. 1 is an illustration of a digital medium environment in an example implementation that is operable to employ dynamic shard allocation techniques described herein.

A near real-time search platform may employ a distributed architecture including a collection of multiple interconnected nodes (e.g., servers) that work together to store and manage data, referred to herein as a cluster. The nodes are divided into smaller units called shards, which store at least a portion of an index. Shards enable the near real-time search platform to perform search and indexing operations in parallel. For example, the near real-time search platform may distribute a query across all relevant shards, and each shard processes its portion of the data independently. This parallel processing reduces query response times.

A given shard may have one or more replica shards, also referred to herein as "replicas." A replica is an exact copy of the original shard on a separate node, which increases a fault tolerance of the cluster. For example, if a node or shard goes offline or becomes degraded, the replica serves as a backup. Furthermore, even while the original shard remains online and functional, its replica may respond to queries via a functionality known as adaptive replica selection in order to distribute the query load more evenly across the cluster. For example, adaptive replica selection may be employed to improve query performance and reduce response times by selecting the most suitable replica shard for each query (e.g., read request) based on the current query load of the nodes, network conditions, and the like.

During creation, new shards are allocated according to a number of shards per node, disk usage, and a watermark configuration that defines lower and upper limits for disk usage on a given node in order to ensure a relatively even distribution of the shards across the nodes. However, this allocation strategy does not take query load into account. For instance, a first node having higher disk usage may primarily store older, less frequently queried indices in its shards compared to a second node having a lower disk usage but newer, more frequently queried indices. As such, a new shard may be allocated to the second node even though the second node receives a higher query load than the first node. While adaptive replica selection takes query load into account, depending on the locations of the replicas across the cluster, adaptive replica selection may be unable to achieve efficient and effective query load balancing.

Existing shard management techniques primarily rely on predefined criteria for shard creation, reallocation, combination, and deletion. For example, a technique known as index lifecycle management performs actions based on index age and relies on predefined tiers such as "hot," "warm," and "cold" based on age. These techniques often lack the ability to adapt dynamically to evolving cluster conditions, leading to suboptimal performance of the near real-time search platform and resource imbalances. Additionally, the existing methods are typically designed for append-only use cases and are thus not widely applicable to use cases that include modifying or deleting data in the indices.

Accordingly, dynamic shard allocation in a near real-time search platform is described. This technique enables shard movements that bring balance to the query load of the cluster to be identified and executed based on a real-time assessment of the query load distribution in the cluster in a manner that does not rely on cluster-level node configurations or static cluster ranking criteria. In general, cluster balancing is an NP-hard (non-deterministic polynomial-time hard) optimization problem that cannot be solved with global or local optimum search algorithms because each move affects the cluster balance in a way that cannot be predicted mathematically. Thus, in accordance with the techniques described herein, the dynamic shard allocation includes planning and performing one or more shard exchanges between a high query load node and a low query load node in response to detecting that the query load distribution is imbalanced across the cluster, reassessing the query load distribution in the cluster, and performing one or more additional shard exchanges in response to the query load distribution remaining imbalanced.

In one example, a shard allocation manager assesses cluster balance, or lack thereof, by determining a standard deviation of a number of queries per node executed during a defined time interval. Cluster imbalance is detected in response to a highest number of per node queries received during the time interval being greater than a median number of per node queries by at least the standard deviation. In response to the cluster imbalance being detected, the shard allocation manager ranks the nodes and shards based on query rates per node and per shard during the defined time interval. For example, the high query load node is selected based on the high query load node receiving more queries relative to the other nodes of the cluster during the defined time interval, and the low query load node is selected based on the low query load node receiving fewer queries relative to the other nodes of the cluster during the defined time interval. A high query load shard is selected from the high query load node, e.g., based on the high query load shard receiving more queries than other shards of the high query load node. Similarly, a low query load shard is selected from the low query load node, e.g., based on the low query load shard receiving fewer queries than other shards of the low query load node.

The high query load shard is exchanged with the low query load shard, and the cluster balance is reassessed before more shard moves are planned, if indicated. That is, the high query load shard is written to the low query load node and deleted from the high query load node, and the low query load shard is written to the high query load node and deleted from the low query load node. Exchanging a pair of shards between two nodes avoids triggering an automatic action of the near real-time search platform to balance shard number between the nodes. For example, if the high query load shard were moved from the high query load node to the low query load node without moving the low query load shard at the same time, a random shard may be moved to the high query load node, which may result in undesirable effects on the query load distribution.

As a result, the techniques described herein overcome the challenges of conventional techniques by enabling the query load to be analyzed in real-time to identify shard moves that are predicted to bring balance to the query load distribution of the cluster. Notably, the techniques described herein do not rely on cluster-level node configurations and static criteria to categorize particular nodes as "hot," "cold," etc., which may change with changing query traffic patterns and as new indices are created. Instead, the nodes and shards are categorized as hot versus cold relative to each other according to the real-time query load distribution assessment. Moreover, because each shard move affects the cluster balance in a way that cannot be predicted mathematically due to, for example, adaptive replica selection, by performing a small number of shard moves at a time and reassessing the query load distribution across the cluster, cluster balancing may be efficiently achieved in a manner that is adaptable to a variety of use case scenarios. By balancing the query load distribution across the cluster by moving previously created shards between nodes, a query latency of the near real-time search platform may be reduced while more efficiently utilizing the computing resources of the cluster. Further discussion of these and other examples is included in the following sections and shown in corresponding figures.

In the following discussion, an example environment is first described that may employ the techniques described herein. Examples of implementation details and procedures are then described which may be performed in the example environment as well as other environments. Performance of the example procedures is not limited to the example environment and the example environment is not limited to performance of the example procedures.

Example of an Environment

FIG. 1 is an illustration of a digital medium environment 100 in an example implementation that is operable to employ dynamic shard allocation techniques described herein. The illustrated environment 100 includes a service provider system 102, a computing device 104, and a plurality of client devices 106 that are communicatively coupled, one to another, via a network 108. Computing devices that implement the service provider system 102, the computing device 104, and the client devices 106 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described with respect to FIG. 6.

The service provider system 102 includes an executable service platform 110. The executable service platform 110 is configured to implement and manage access to digital services 112 "in the cloud" that are accessible by the client devices 106 via the network 108. Thus, the executable service platform 110 provides an underlying infrastructure to manage execution of the digital services 112, e.g., through control of underlying computational resources.

The executable service platform 110 supports numerous computational and technical advantages, including an ability of the service provider system 102 to readily scale resources to address wants of an entity associated with the client devices 106. Thus, instead of incurring an expense of purchasing and maintaining proprietary computer equipment for performing specific computational tasks, cloud computing provides the client devices 106 with access to a wide range of hardware and software resources so long as the client has access to the network 108.

The digital services 112 can take a variety of forms. Examples of digital services include social media services, document management services, storage services, media streaming services, content creation services, productivity services, digital marketplace services, auction services, and so forth. By way of example, execution of the digital services 112 by the executable service platform 110 generates data 114, which are illustrated as being stored in a near real-time search platform 116, abbreviated as "NRT search platform 116" in the figures. The data 114 describe execution of the digital services 112 in this example as well as values of events that occur during this execution. The data 114 may be generated, for instance, in response to user interaction with the service provider system 102 and may describe content or listings created by a user, transactions performed by the user, and/or a behavior of the user. In at least one implementation, the data 114 are time-series data. The data 114 may also be retrieved from the near real-time search platform 116 for use by one or more domain services 118, e.g., in response to a query 120. Non-limiting examples of the one or more domain services 118 include a user experience domain 122, a user behavior domain 124, and a search and recommendation domain 126.

In a search and recommendation example, for instance, the data 114 are used by the search and recommendation domain 126 to generate recommendations of items of digital content. The recommendations are configurable in a manner similar to performing a search based on a search query to locate the items of digital content. Use of the search result as a recommendation supports a variety of usage scenarios, including digital audio recommendations, digital video recommendations, auction items, and so forth.

The near real-time search platform 116 is a distributed data storage and retrieval system that is structured to enable efficient storage and retrieval of the data 114. In at least one implementation, the near real-time search platform 116 includes functionality for storing the data 114 and making the data 114 searchable in near real-time. As used herein, "near real-time" (e.g., NRT) refers to a small latency, such as in a range from 0.5-1.5 seconds. As such, the data 114 become searchable via the near real-time search platform 116 substantially at the time of creation and without intentional delay.

To store the data 114 in a searchable format, the near real-time search platform 116 includes a cluster 128. The cluster 128 is a collection of one or more nodes (e.g., servers) that hold an entirety of the data 114 and provide federated indexing and search capabilities across all of the nodes. A node is a single server within the cluster 128 that stores a portion of the data 114 held in the cluster. In the depicted example, the cluster 128 includes a first node 130 (e.g., "node 1"), a second node 132 (e.g., "node 2"), and a third node 134 (e.g., "node 3"), with ellipses denoting that additional nodes may be present in the cluster 128. The nodes are further divided into a plurality of shards that include at least a portion of an individual index. For example, the index may be stored in a single shard or subdivided into a plurality of shards, such as when an amount of data in the index exceeds a storage capacity of a single node. An index is a collection of documents that have a shared characteristic, such as customer data or product data. As a non-limiting example, the data 114 are distributed across daily indices. For example, a first index includes data generated and stored on a first date, a second index includes the data generated and stored on a second date following the first date, and so forth.

In the digital medium environment 100 shown in FIG. 1, the first node 130 includes shards 136, the second node 132 includes shards 138, and the third node 134 includes shards 140. A first portion of the shards 136, the shards 138, the shards 140, are primary (e.g., original) shards that handle write operations for its index, while a second, remaining portion are replicas of the primary shards. The replicas are exact copies of primary shards and are assigned to different nodes and hardware racks from the corresponding primary shard in order to provide redundancy and fault tolerance. The replicas, for instance, can also respond to read requests, thus distributing the search and retrieval load across multiple nodes and providing a backup in case the primary shard becomes degraded or unavailable. Additional details regarding the organization of the shards in the respective nodes will be described herein, e.g., with respect to FIGS. 3A and 3B.

The near real-time search platform 116 further includes a cluster controller 142 and a cluster coordinator 144. The cluster controller 142 includes functionality to perform cluster-wide management tasks, such as such as creating or deleting indices, managing shard allocation, and maintaining a cluster state 146 of the cluster 128, as will be elaborated below. The cluster coordinator 144 includes functionality to receive the query 120 and coordinate the execution of a corresponding search across relevant nodes and shards of the cluster 128. In at least one implementation, the cluster controller 142 and the cluster coordinator 144 are nodes included in the cluster 128. For example, the cluster controller 142 is a master node of the cluster 128.

The cluster coordinator 144 is configured to receive the query 120, which includes a request to retrieve data stored in the cluster 128 as a query result 148. By way of example, the query 120 may include query terms, criteria, filters, aggregations, and/or other parameters that define what is to be returned as the query result 148. The query 120 may be submitted by a user and/or an application, such as one of the one or more domain services 118. By way of example, the query 120 is submitted through a user-initiated process, via an automated schedule (e.g., at a pre-determined time interval or time of day), or via another type of event trigger.

In response to receiving the query 120, the cluster coordinator 144 parses the query 120 to determine a search intent and further determines which shard(s) to query based on the search intent. The cluster coordinator 144 transmits the query 120, or a portion thereof, to the corresponding node(s) storing the relevant shard(s), which execute the query 120. In instances where more than one shard is queried, parallel processing may be used to execute the query 120 concurrently across multiple shards. The cluster coordinator 144 receives the requested data from the relevant shard(s) and outputs them to the requesting entity as the query result 148.

The executable service platform 110 further includes an analytics and management platform 150 that is in electronic communication with the near real-time search platform 116. The analytics and management platform 150, for instance, receives data from the near real-time search platform 116, such as an indication of the cluster state 146 as well as real-time measurements of query load across the cluster 128. The cluster state 146 is a data structure object that contains information about the configuration of the cluster 128, including a list of nodes, indices, shard distribution across the nodes, and other metadata. The cluster state 146 is managed by the cluster controller 142 and is updated as changes occur in the cluster 128, which is then communicated to the analytics and management platform 150. The analytics and management platform 150 may store the cluster state 146 as a part of cluster operational data 152 in a storage device 154.

In accordance with the techniques described herein, the analytics and management platform 150 includes a shard allocation manager 156 that has functionality for evaluating a real-time query load of the cluster 128 and identifying whether to perform cluster balancing by exchanging shards between nodes. By way of example, the shard allocation manager 156 performs cluster balancing according to steps of one or more algorithms that are stored in non-transitory memory and executed by one or more processors, shown in FIG. 1 as a dynamic shard allocation algorithm 160. As such, the shard allocation manager 156 is configured as a special-purpose machine for performing dynamic shard allocation. As will be described in detail herein, as a part of the dynamic shard allocation algorithm 160, the shard allocation manager 156 executes a real-time measurement of a query load in the cluster 128 to determine if cluster balancing is indicated, e.g., in response to a query load imbalance being greater than a threshold imbalance. Responsive to cluster balancing being indicated, the shard allocation manager 156 identifies which shards to exchange in order to distribute the query load more evenly across the nodes of the cluster 128. Upon identifying the shards, the shard allocation manager 156 transmits a command 158 to the cluster controller 142 to instruct the cluster controller 142 to perform the shard exchange. The shard exchange is confirmed by an update to the cluster state 146 received from the cluster coordinator 144.

Although not explicitly shown in FIG. 1, the cluster operational data 152 may further include the real-time measurement of the query load, a log of which shards have been moved during execution of the dynamic shard allocation algorithm 160, and/or another indication that the dynamic shard allocation algorithm 160 has been executed, even when no shards are exchanged. Although the storage device 154 is shown as included in the analytics and management platform 150, it is to be appreciated that the storage device 154 may be remote from the shard allocation manager 156, such as located in a server that is remote from the shard allocation manager 156, and accessed by the shard allocation manager 156 via the network 108.

In at least one implementation, the analytics and management platform 150 is configured to generate a platform management user interface 162, which is illustrated as accessed by the computing device 104 via the network 108 using a communication module 164, e.g., a browser, a network-enabled application, or the like. The platform management user interface 162, as displayed by a display device 166, is further usable to receive inputs to specify, for example, a status (e.g., enabled or disabled), an execution time and/or timing (e.g., daily at a specified time), and/or the threshold imbalance of the dynamic shard allocation algorithm 160. In one or more implementations, the analytics and management platform 150 may further output a monitoring notification 168 that may be accessed via the platform management user interface 162. The monitoring notification 168 may indicate that the dynamic shard allocation algorithm 160 was performed as well as a result of the algorithm, e.g., whether or not shards were exchanged, how many shards were exchanged, and the like. As such, a user (e.g., developer) may program and/or adjust the dynamic shard allocation algorithm 160.

By performing the dynamic shard allocation via the analytics and management platform 150, the near real-time search platform 116 is able to execute the query 120 and return the query result 148 with reduced latency and without overloading individual nodes. As a result, the performance of the near real-time search platform 116 may be increased, with fewer query timeouts and increased reliability.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Dynamic Shard Allocation in a Near Real-Time Search Platform

Figure 2:
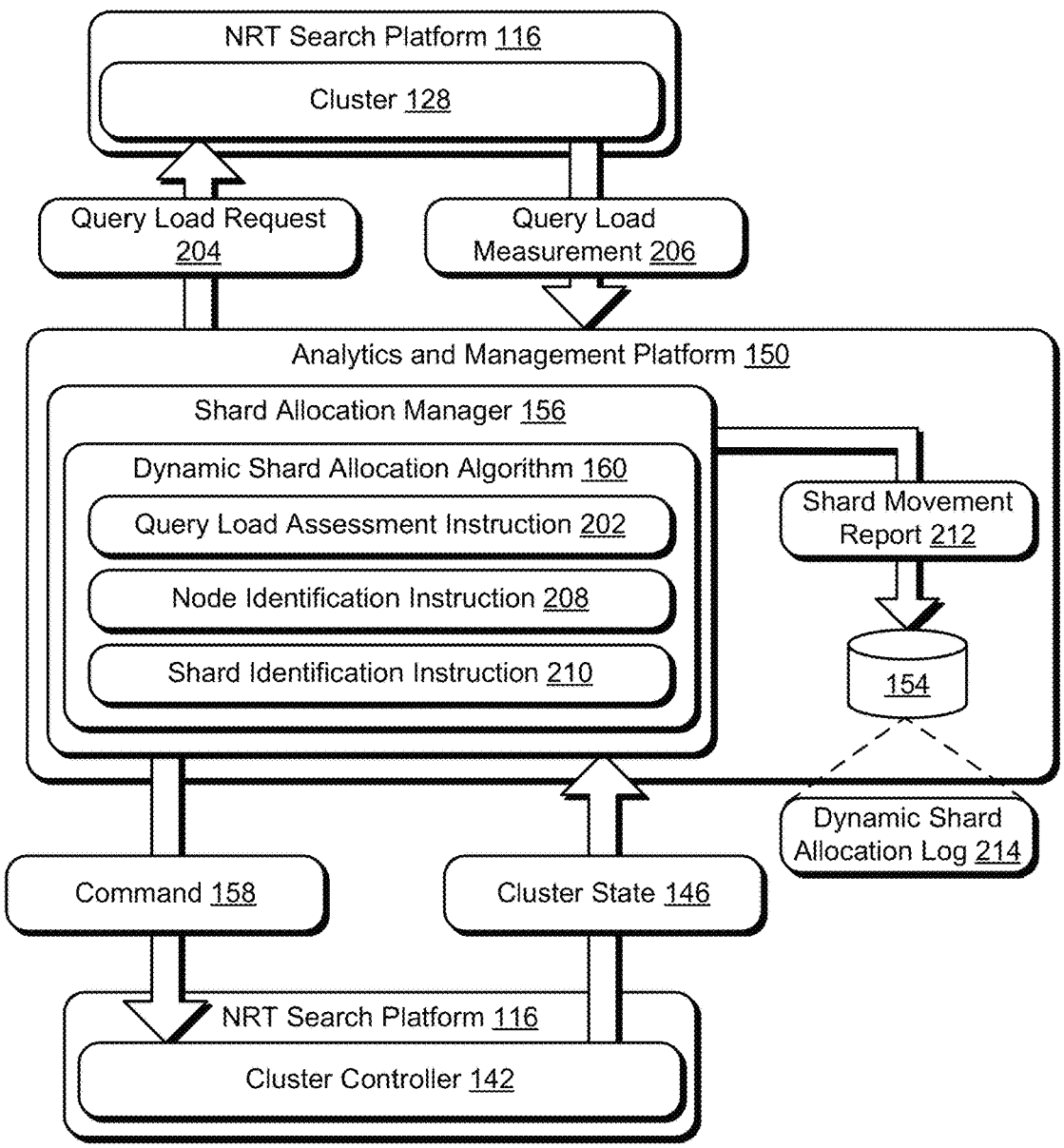
FIG. 2 depicts an example implementation showing operation of an analytics and management platform to perform dynamic shard allocation in a cluster of a near real-time search platform.

FIG. 2 depicts an example implementation 200 showing operation of the analytics and management platform 150 of FIG. 1 to perform dynamic shard allocation in the cluster 128 in greater detail. The following discussion describes techniques that are implementable utilizing the previously described systems and devices.

The shard allocation manager 156 of the analytics and management platform 150 executes the dynamic shard allocation algorithm 160, e.g., according to a programmed schedule and/or responsive to a user-initiated request. The dynamic shard allocation algorithm 160 includes a query load assessment instruction 202, which is executed to perform a real-time measurement of a query load distribution of the cluster 128 over a time interval (e.g., duration) that is defined by the query load assessment instruction 202. The time interval, for instance, may be a time duration in a range from one to three minutes, such as two minutes. In variations, the time interval is less than one minute or greater than three minutes.

In at least one implementation, the query load assessment instruction 202 causes the shard allocation manager 156 to transmit a query load request 204 to the cluster 128, and in response, the cluster 128 transmits a query load measurement 206 to the shard allocation manager 156. The query load measurement 206 includes the number of queries received by the cluster 128 during the time interval on a per-node and a per-shard basis. For example, the query load measurement 206 specifies the number of queries that each node and each shard within each node has received during the time interval.

The query load assessment instruction 202 further causes the shard allocation manager 156 to identify whether shard movement for cluster balancing is indicated based on the query load measurement 206. By way of example, the shard movement is indicated in response to a query load distribution of the cluster 128, as determined from the query load measurement 206, having at least a threshold imbalance. For instance, the shard allocation manager 156 may calculate the median number of queries per node as well as the standard deviation of the number of queries per node from the query load measurement 206, and the shard allocation manager 156 may determine that the threshold imbalance is present in response to a highest number of queries per node being greater than the median by at least the standard deviation.

In response to the cluster 128 having at least the threshold imbalance, the shard allocation manager 156 further evaluates the query load measurement 206 via a node identification instruction 208. The node identification instruction 208 is executed to rank the nodes according to query number, such as from highest query number (and therefore the highest query load) in descending order to lowest query number. Alternatively, the nodes may be ranked in ascending order, from lowest query number to highest query number. As such, the node identification instruction 208 enables the shard allocation manager 156 to identify a hot node experiencing the highest query load of the cluster 128 during the time interval and a cold node experiencing the lowest query load of the cluster 128. With respect to nodes and shards, the terms "hot" and "cold" as used herein refer to relative query load (e.g., query number) and are not meant to denote temperature. That is, "hot" refers to a high query number with respect to other nodes/shards of the cluster 128, and "cold" refers to a low query number with respect to the other nodes/shards of the cluster 128.

The shard allocation manager 156 further executes a shard identification instruction 210 in order to identify one or more shards of the hot node to exchange with one or more shards of the cold node. The shard identification instruction 210 is performed to rank the shards within the identified hot node and cold node according to query number, such as in ascending or descending order, in order to identify the shards experiencing the highest query load in the hot node and the shards experiencing the lowest query load in the cold node during the time interval.

In at least one implementation of the near real-time search platform 116, moving a shard from the hot node will trigger movement of another shard to the hot node in order to keep the number of shards per node balanced. Accordingly, in executing the shard identification instruction 210, the shard allocation manager 156 identifies a pair that includes a high query load shard from the hot node and a low query load shard from the cold node in order to avoid this automatic and uncontrolled trigger. It is to be appreciated that more than one pair may be exchanged during a given move, and a number of pairs to exchange during the move may be a pre-programmed value. For example, the number of pairs may be one or greater than one, such as three. Exchanging more than one pair during a move may bring balance to the cluster 128 more quickly than when a single pair is exchanged. However, performing too many moves at once may increase a query latency of the cluster as well as unintentionally imbalance the cluster 128 due to, for example, adaptive replica selection where the query 120 is routed to a different replica shard (and thus node) after the move.

The shard identification instruction 210 further includes criteria for identifying which shards to include in the pair. The criteria, for instance, include a condition that shards and their replicas are not placed on the same node and hardware rack, as doing so would degrade the redundancy and fault tolerance of the cluster 128. As another example, the criteria may include a condition that shards corresponding to indices with active data ingestion are not moved, as doing so would disrupt storage of the data 114 depicted in FIG. 1. As such, in executing the shard identification instruction 210, the shard allocation manager 156 may disqualify shards that do not meet the criteria. For example, shards of the hot node that have replicas on the cold node, and vice versa, may be disqualified from selection, as well as shards undergoing active data ingestion. Additionally or alternatively, the shard allocation manager 156 may initially select a first high query load shard of the hot node that receives the highest query load and a first low query load shard of the cold node that receives the lowest query load, evaluate whether the first high query load shard and the first low query load shard meet the criteria, and then either confirm the selection of the first high query load shard and the first low query load shard (e.g., in response to the first high query load shard and the first low query load shard meeting the criteria) or adjust the selection until a pair is selected that meets the criteria. As an example, if the first high query load shard has a replica on the cold node, then the shard allocation manager 156 may select a second high query load shard having the second highest query load on the hot node and re-evaluate.

Once the shard allocation manager 156 identifies at least one pair of shards to exchange between the hot node and the cold node, the shard allocation manager 156 issues the command 158, which is received by the cluster controller 142 of the near real-time search platform 116. For an identified pair, the command 158 specifies which shard of the hot node to relocate to the cold node and which shard of the cold node to relocate to the hot node. The cluster controller 142 performs the exchange by writing the identified high query load shard from the hot node to the cold node, writing the identified low query load shard from the cold node to the hot node, deleting the high query load shard from the hot node, and deleting the low query load shard from the cold node. After performing the exchange, the cluster controller 142 outputs the cluster state 146, which reports the current locations of the shards with respect to the nodes. The cluster state 146 provides an indication to the shard allocation manager 156 that the exchange has been performed, for example, by indicating that the high query load shard is active on the cold node and the low query load shard is active on the hot node.

In response to receiving the cluster state 146, the shard allocation manager 156 reassesses the cluster balance, e.g., by repeating the query load assessment instruction 202 and receiving a new query load measurement 206 at the current time, after the shard exchange has occurred. As will be elaborated below with respect to FIG. 5, the node identification instruction 208 and the shard identification instruction 210 are repeated if the cluster 128 remains imbalanced. Alternatively, if the cluster 128 is considered balanced, the shard allocation manager 156 generates and outputs a shard movement report 212, which is stored in the storage device 154 as part of a dynamic shard allocation log 214. The shard movement report 212, for instance, specifies that the dynamic shard allocation algorithm 160 was performed, which shards were moved during execution, and so forth. If no shards are moved, execution of the dynamic shard allocation algorithm 160 is logged along with an indication that the cluster was sufficiently balanced.

Although the query load assessment instruction 202, the node identification instruction 208, and the shard identification instruction 210 are described individually above, it is to be appreciated that at least portions of the query load assessment instruction 202, the node identification instruction 208, and the shard identification instruction 210 may be combined. Moreover, is to be appreciated that in one or more implementations, at least parts of the query load measurement 206, the node identification instruction 208, and/or the shard identification instruction 210 are executed in parallel.

Figure 3A:
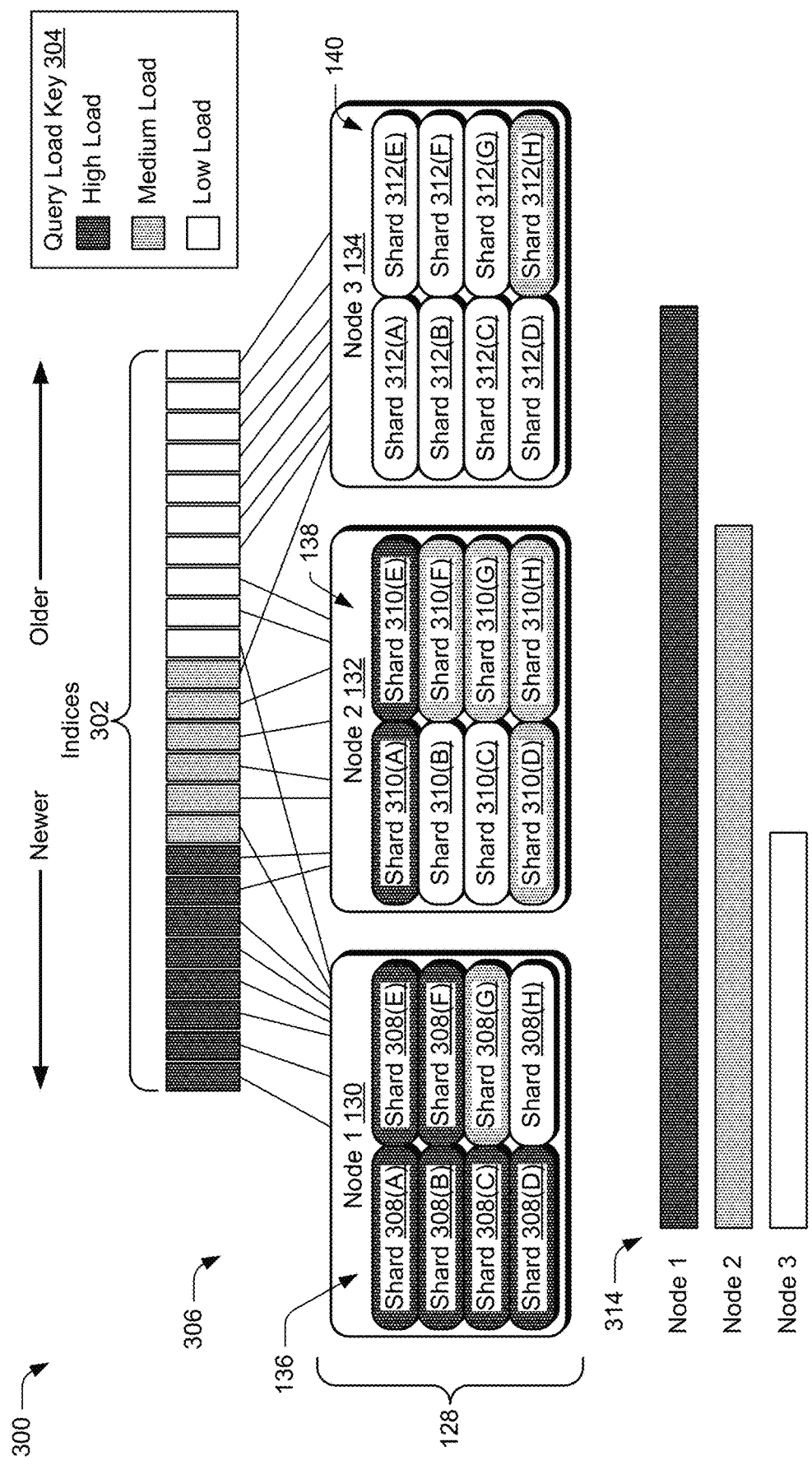
FIGS. 3A and 3B show an illustrative example of dynamic shard allocation for cluster balancing in a near real-time search platform.
Figure 3B:
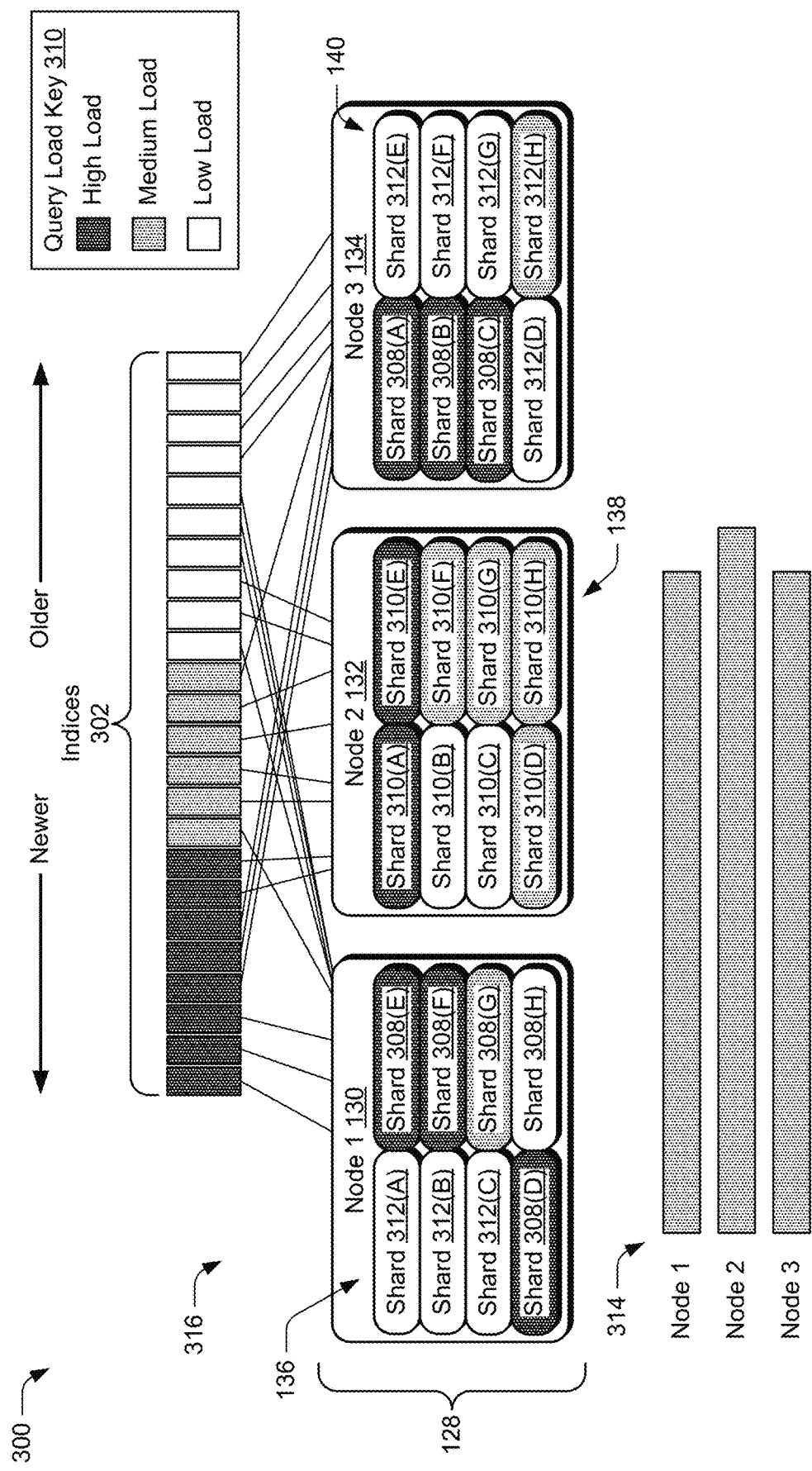

FIGS. 3A and 3B show an illustrative example 300 of dynamic shard allocation for cluster balancing in a near real-time search platform. The illustrative example 300 includes, from FIG. 1, the cluster 128, the first node 130, the second node 132, and the third node 134. Although the illustrative example 300 includes three nodes in the cluster 128, it is to be appreciated that more than three nodes may be included.

As shown in FIGS. 3A and 3B, indices 302 are distributed across the cluster 128, e.g., in the shards 136 of the first node 130, the shards 138 of the second node 132, and the shards 140 of the third node 134. The indices 302 are displayed according to a time of creation, with newer indices positioned toward the left and older indices positioned toward the right. Thus, the newest index is in the left-most position, and the oldest index is in the right-most position. A fill of the indices 302 and the corresponding shards denotes a relative query load (e.g., during the query load measurement 206), as indicated by a query load key 304. High query load is indicated by dark fill, medium query load is indicated by light fill, and low query load is indicated by an open fill, e.g., no or white fill. In the illustrative example 300, the newer indices 302 receive more queries than the older indices 302. That is, the eight newest indices 302 receive a high query load, as indicated by the dark fill, and the ten oldest indices 302 receive a low query load, as indicated by the open fill. The remaining six indices between the eight newest and the ten oldest receive a medium query load, as indicated by the light fill.

In a first cluster state 306 shown in FIG. 3A, the high query load indices are concentrated in the first node 130, including in a shard 308(A), a shard 308(B), a shard 308(C), a shard 308(D), a shard 308(E), and a shard 308(F). The shards 136 of the first node 130 further include a shard 308(G), which stores a medium query load index, and a shard 308(H), which stores a low query load index. The shards 138 of the second node 132 include a mix of high query load, medium query load, and low query load indices. The shards 138 include a shard 310(A), a shard 310(B), a shard 310(C), a shard 310(D), a shard 310(E), a shard 310(F), a shard 310(G), and a shard 310(H). The shard 310(A) and the shard 310(E) are high query load shards, while the shard 310(B) and the shard 310(C) are low query load shards. The shard 310(D), the shard 310(F), the shard 310(G), and the shard 310(H) are medium query load shards. The low query load indices are concentrated in the third node 134, including in a shard 312(A), a shard 312(B), a shard 312(C), a shard 312(D), a shard 312(E), a shard 312(F), and a shard 312(G). The shards 140 of the third node 134 further include a shard 312(H), which stores a medium query load index.

Because the high query load indices are concentrated in the first node 130 and the low query load indices are concentrated in the third node 134, the cluster 128 is imbalanced in the first cluster state 306. For example, as depicted in a node activity chart 314, the first node 130 receives a high query load, the second node 132 receives a medium query load, and the third node 134 receives a low query load. As a result, central processing unit (CPU) usage by the first node 130 may be near 100%, while the third node 134 has underutilized computing resources. Moreover, a transaction time for the queries serviced by the first node 130 may be increased compared to those of the second node 132 and the third node 134. As such, the shard allocation manager 156 performs the dynamic shard allocation algorithm 160, such as described above with respect to FIG. 2, in order to distribute the query load more evenly throughout the cluster 128.

Referring now to FIG. 3B, a second cluster state 316 is shown. In the second cluster state 316, the shards 308(A), 308(B), and 308(C), which store high query load indices, have been exchanged with the shards 312(A), 312(B), and 312(C), which store low query load indices. That is, the shards 308(A), 308(B), and 308(C) have been written to the third node 134 and deleted from the first node 130, and the shards 312(A), 312(B), and 312(C) have been written to the first node 130 and deleted from the third node 134. As a result, the node activity chart 314 shows that all three nodes receive a medium query load, indicating that the query load is substantially evenly distributed across the cluster 128. As a result, the transaction time for the queries serviced by the first node 130 is decreased compared to the first cluster state 306, and computing resources are more efficiently utilized across the cluster 128.

Figure 4:
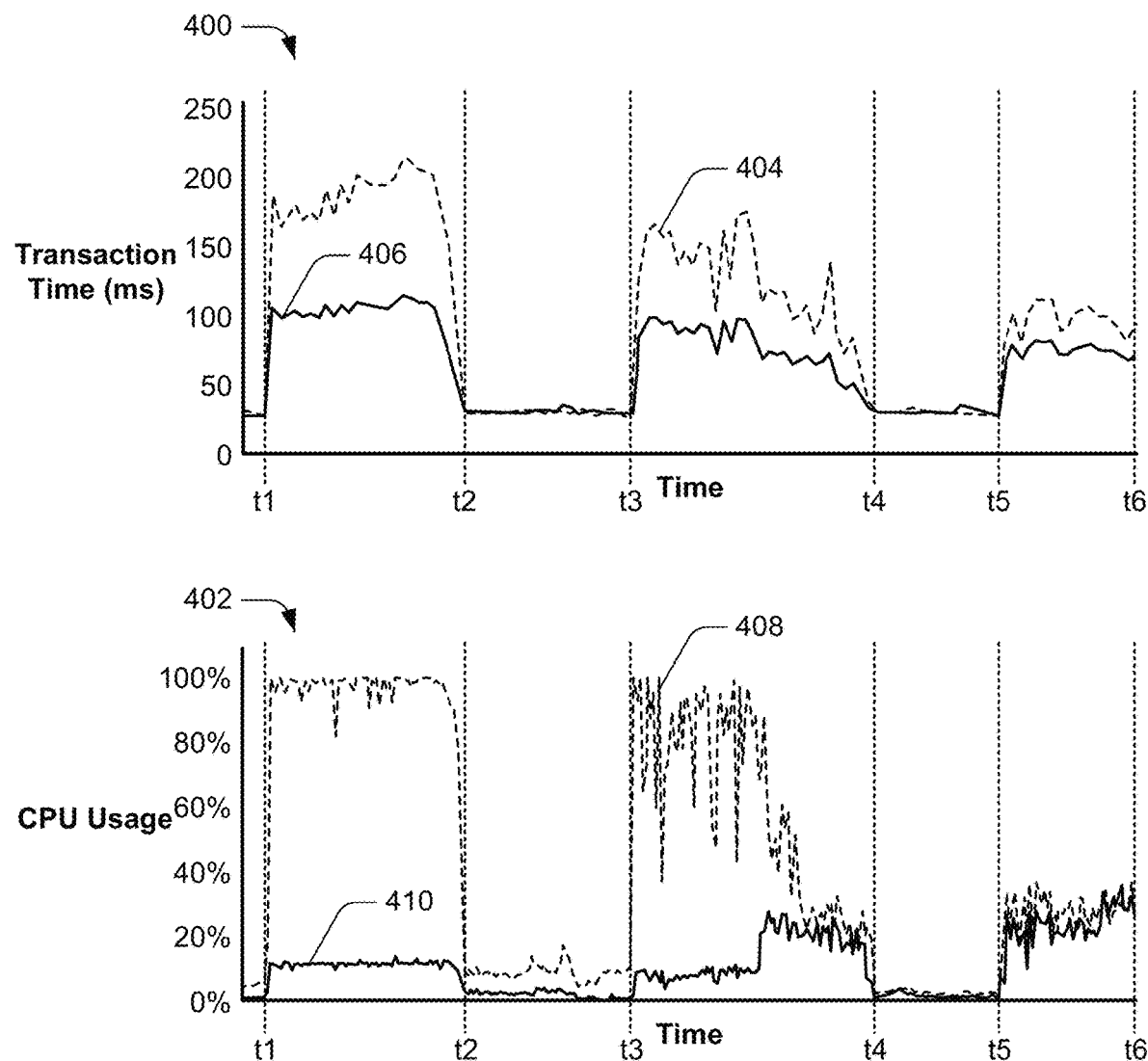
FIG. 4 shows an example of transaction times and processing unit usage for two nodes before and after cluster balancing via dynamic shard allocation has been performed.

The effect of the dynamic shard allocation on a performance of a near real-time search platform will now be further described with reference to FIG. 4. FIG. 4 shows an example of transaction times and CPU usage for two nodes before and after cluster balancing via dynamic shard allocation has been performed. In particular, FIG. 4 depicts an example graph 400 of transaction times (in milliseconds, ms) and an example graph 402 of CPU usage (in percent) for the two nodes. The graph 400 includes a dashed plot 404 of the transaction time (vertical axis) for a first node over time (horizontal axis) and a plot 406 of the transaction time for a second node over time. The graph 402 includes a dashed plot 408 of the CPU usage (vertical axis) of the first node over time (horizontal axis) and a plot 410 of the CPU usage of the second node over time. In the example depicted in FIG. 4, the graph 400 and the graph 402 are time-aligned, and in the following discussion, reference will be made to time points of interest.

A first duration occurs between a first time point t1 and a second time point t2. During the first duration, the first node is a high query load node, and the second node is a low query load node. Because of this, the transaction time of the first node is approximately twice that of the second node, as depicted by a comparison of the dashed plot 404 and the plot 406 of the graph 400. Moreover, as shown in the graph 402, the CPU usage of the first node (the dashed plot 408) nears 100% during the first duration, indicating that the resource utilization by the first node is at capacity. In contrast, the CPU usage of the second node (the plot 410) is less than 20%, indicating that the second node is under-utilizing computing resources. As such, a query load imbalance is detected between the first node and the second node.

In response to the imbalance between the first node and the second node being detected, the dynamic shard allocation algorithm 160 is performed during a second duration spanning between a third time point t3 and a fourth time point t4. By way of example, at least one high query load shard of the first node is exchanged with at least one low query load shard of the second node. While the dynamic shard allocation algorithm 160 is in progress, the transaction time of the first node (the dashed plot 404) decreases toward that of the second node (the plot 406), particularly during a second half of the second duration. Similarly, approximately halfway through the second duration, the CPU usage of the first node (the dashed plot 408) decreases, while the CPU usage of the second node (the plot 410) increases.

The dynamic shard allocation algorithm 160 is again performed during a third duration spanning between a fifth time point t5 and a sixth time point t6, such as in response to imbalance remaining between the first node and the second node. During the third duration, the transaction time of the first node (the dashed plot 404) is approximately 100 ms, which is approximately half that of the transaction time during the first duration, before the cluster balancing was performed. The transaction time of the second node (the plot 406) is similar to that of the first node during the third duration, such as around 80 ms. Moreover, the CPU usage by the first node (the dashed plot 408) and the second node (the plot 410) are substantially the same at around 30%, as shown by the overlapping plots of the graph 402 during the third duration. As a result, the first node and the second node are considered balanced with respect to each other, with the query load distributed between the first node and the second node in a substantially equivalent (e.g., within a standard deviation from the median) manner.

By balancing the query load distribution between the first node and the second node, an average transaction time of the first node and the second node decreases, enabling a faster return of the query result 148 and a decreased occurrence of timeouts. Furthermore, an average CPU usage between the first node and the second node decreases, enabling efficient resource utilization compared to the pre-balanced state. Overall, performing the dynamic shard allocation algorithm 160 improves the performance of the near real-time search platform 116.

Example Procedure

This section describes an example of a procedure for dynamic shard allocation in a near real-time search platform. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Figure 5:
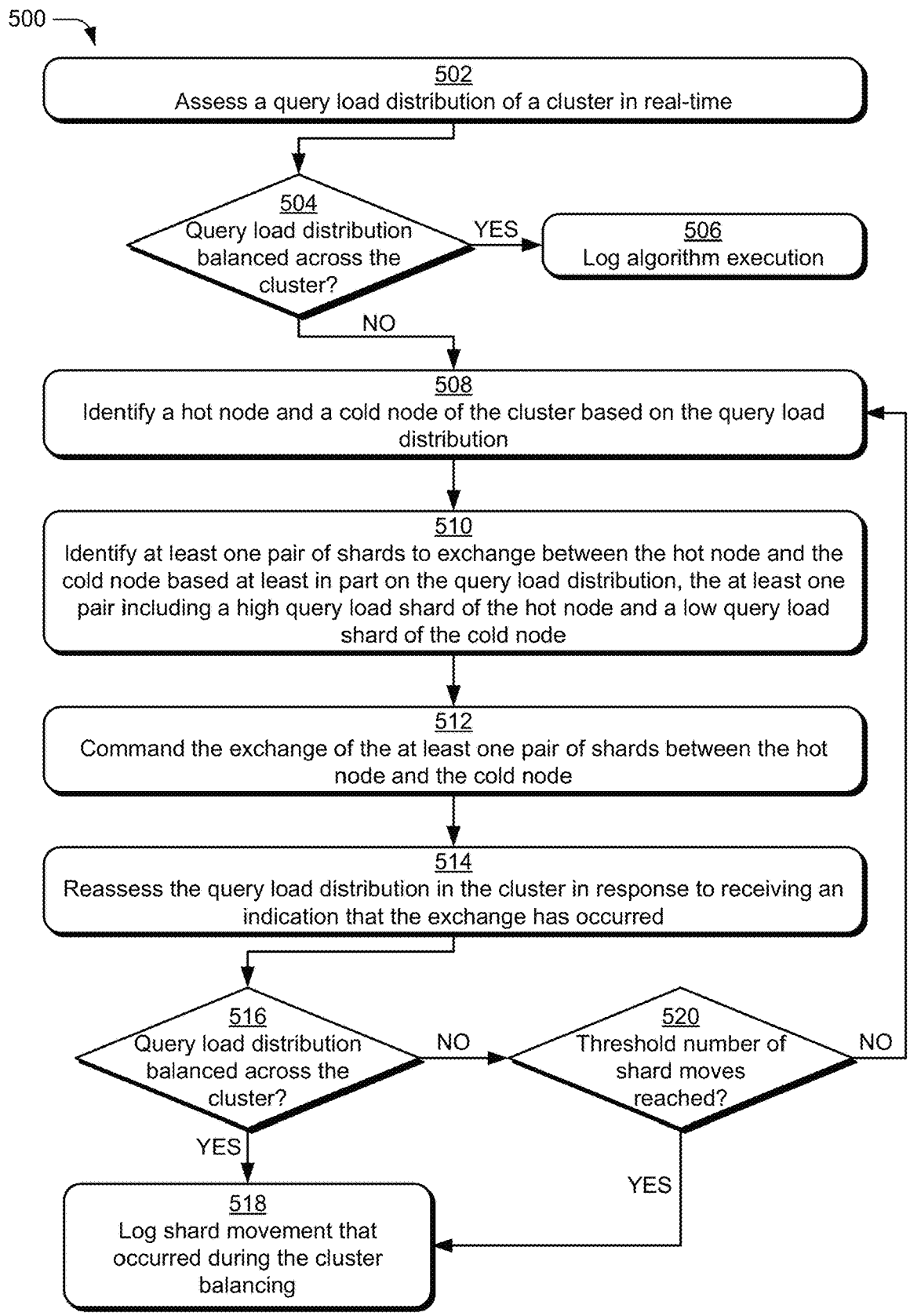
FIG. 5 is a flow diagram depicting an algorithm as a step-by-step procedure in an example of implementing dynamic shard allocation in a near real-time search platform.

FIG. 5 is a flow diagram depicting an algorithm as a step-by-step procedure 500 in an example of implementing dynamic shard allocation in a near real-time search platform. In at least one implementation, the procedure 500 is performable by the analytics and management platform 150 of the service provider system 102 of FIG. 1. For example, the analytics and management platform 150 includes (or otherwise accesses) instructions stored in one or more computer-readable storage media that, when executed by at least one processor (or processing system), cause the at least one processor (or processing system) to perform the step-by-step procedure 500 as a series of operations, e.g., the dynamic shard allocation algorithm 160. At least a portion of the one or more computer-readable storage media and/or the at least one processor may be remote from the analytics and management platform 150 and accessed via the network 108.

In one or more implementations, the step-by-step procedure 500 is executed according to pre-determined schedule and/or at a pre-determined frequency, such as daily, weekly, monthly, or the like. The pre-determined schedule and/or pre-determined frequency, for instance, may be selected based on a size of the cluster 128 and an index creation pattern. For example, if the index creation pattern includes creating daily indices, then the step-by-step procedure 500 may be performed daily in order to ensure the cluster 128 remains balanced responsive to the creation of a new index.

A query load distribution of a cluster is assessed in real-time (block 502). By way of example, the analytics and management platform 150 receives the query load measurement 206, which includes the number of queries received by the cluster 128 during a pre-determined time interval on a per-node and per-shard basis. The pre-determined time interval, for instance, may be a time duration in a range from one to three minutes, such as two minutes. In variations, the pre-determined time interval is less than one minute or greater than three minutes.

It is determined if the query load distribution is balanced across the cluster (block 504). By way of example, to determine if the query load distribution is balanced across the cluster, the shard allocation manager 156 calculates the median number of queries per node across the cluster as well as the standard deviation of the number of queries per node from the query load measurement 206. The query load distribution is considered to be balanced across the cluster when a highest per-node query number of the cluster is within a threshold from the median number. In contrast, the query load distribution is not considered to be balanced across the cluster (e.g., the query load distribution is imbalanced) when the highest per-node query node is at least the threshold greater than the median number. In at least one implementation, the threshold is equal to the standard deviation. In variations, the threshold is equal to a pre-defined percentage of the median number.

In response to the query load distribution being balanced across the cluster, the execution of the algorithm is logged (block 506). By way of example, the execution of the dynamic shard allocation algorithm 160 is logged in the dynamic shard allocation log 214 along with an indication that the query load distribution was balanced. In one or more implementations, the analytics and management platform 150 may further output a monitoring notification 168 indicating that the dynamic shard allocation algorithm 160 was performed as well as a result of the algorithm, e.g., that the cluster 128 was balanced and no shard movement was performed during the execution.

In contrast, in response to the query load distribution not being balanced across the cluster, a hot node and a cold node of the cluster are identified based on the query load distribution (block 508). By way of example, identifying the hot node and the cold node of the cluster includes ranking (e.g., by the shard allocation manager 156 executing the node identification instruction 208) the nodes of the cluster 128 according to according to query number, such as from highest query number (and therefore the highest query load) in descending order to lowest query number. Alternatively, the nodes may be ranked in ascending order, from lowest query number to highest query number. In at least one implementation, the hot node receives the highest query number of the cluster 128 during the pre-determined interval, while the cold node receives the lowest query number of the cluster 128 during the pre-determined interval. As such, the hot node receives more queries than other nodes of the cluster 128 during the pre-determined interval, whereas the cold node receives fewer queries than other nodes of the cluster 128 during the pre-determined interval.

At least one pair of shards to exchange between the hot node and the cold node is identified based at least in part on the query load distribution, the at least one pair including a high query load shard of the hot node and a low query load shard of the cold node (block 510). By way of example, identifying the at least one pair of shards to exchange between the hot node and the cold node includes ranking (e.g., by the shard allocation manager 156 executing the shard identification instruction 210) the shards of the hot node and the shards of the cold node according to query number, such as in ascending or descending order, in order to identify the shards experiencing the highest query load in the hot node and the shards experiencing the lowest query load in the cold node during the pre-determined time interval. The number of pairs to identify is specified by the shard identification instruction 210 and may be a programmable value. As a non-limiting example, the number of pairs is three. However, in variations, the number is less than three (e.g., one or two) or greater than three (e.g., in a range from four to ten). Exchanging more than one pair during a move may bring balance to the cluster 128 more quickly than when a single pair is exchanged. However, performing too many moves at once may increase a query latency of the cluster.

Identifying the at least one pair of shards to exchange between the hot node and the cold node is further based on additional criteria for identifying valid moves accordingly to, e.g., configuration constraints of the cluster. The additional criteria, for instance, specify that shards and replicas are not placed on the same node and hardware rack, as doing so would degrade the redundancy and fault tolerance of the cluster 128. The additional criteria further specify that shards undergoing active data ingestion are not moved, as doing so would disrupt data storage. As such, shards that do not meet the additional criteria may be disqualified from selection, even if these shards would otherwise be selected based on their query load numbers. For example, shards of the hot node that have replicas on the cold node, and vice versa, may be disqualified from selection, as well as shards undergoing active data ingestion.

Additionally or alternatively, identifying the at least one pair of shards to exchange between the hot node and the cold node may be an iterative process that includes initially selecting a shard of the hot node that receives the highest query load and a shard of the cold node that receives the lowest query load, evaluating whether these shards meet the criteria, and confirming their (e.g., in response to meeting the criteria) or adjusting the selection until a pair is selected that meets the criteria.

As an illustrative example where the number of pairs is three, the highest query load shard of the hot node is identified based on the shard ranking. The highest query load shard is not experiencing active data ingestion and does not have a replica on the cold node. Accordingly, the highest query load shard and is selected for the first pair. There is a replica of the second highest query load shard of the hot node on the cold node. Accordingly, the second highest query load shard is disqualified from selection. The third highest query load shard of the hot node does not have a replica on the cold node and is not experiencing data ingestion. Therefore, the third highest query load shard of the hot node is selected for the second pair. The fourth highest query load shard of the hot node is experiencing active data ingestion and is thus not selected. Instead, the fifth highest query load shard of the hot node, which is not experiencing data ingestion and does not have a replica on the cold node, is selected for the third pair. A similar process is performed for the cold node, beginning with the lowest query load shard of the cold node and working toward the highest query load shard of the cold node.

It is to be appreciated that in an instance where none of the shards of the hottest node meet the criteria, the second hottest node (e.g., the node experiencing the second greatest query load) may be selected as the hot node, and so forth. Similarly, when none of the shards of the coldest node meet the criteria, the second coldest node (e.g., the node experiencing the second lowest query load) may be selected as the cold node. When more than one pair is to be selected for the exchange, shards may be selected from a different hot node and/or a different cold node for one or more pairs. As an illustrative example, a first pair may include a shard from the hottest node and a shard from the coldest node, and in response to none of the other shards of the hottest node meeting the criteria, a second pair may include a shard from the second hottest node and another shard from the coldest node.

The exchange of the at least one pair of shards between the hot node and the cold node is commanded (block 512). By way of example, commanding the exchange of the at least one pair of shards between the hot node and the cold node includes specifying which shard of the hot node to relocate to the cold node and which shard of the cold node to relocate to the hot node for the at least one pair. The command may be issued, for example, by the shard allocation manager 156 and received by the cluster controller 142, which then performs the exchange by writing the high query load shard to the cold node, writing the low query load shard to the hot node, deleting the high query load shard from the hot node, and deleting the low query load shard from the cold node for the at least one pair.

The query load distribution in the cluster is reassessed in response to receiving an indication that the exchange has occurred (block 514). By way of example, after performing the exchange, the cluster controller 142 outputs the cluster state 146, which reports the current locations of the shards and with respect to the nodes. The cluster state 146 provides an indication that the exchange has occurred, for example, by indicating that the high query load shard is active on the cold node and the low query load shard is active on the hot node. Accordingly, the procedure 500 includes receiving, by the shard allocation manager 156, the indication that the exchange has occurred. In response to receiving the indication that the exchange has occurred (e.g., via the cluster state 146), the query load measurement 206 is again obtained over the pre-determined time interval.

It is again determined if the query load distribution is balanced across the cluster (block 516). By way of example, to determine if the query load distribution is balanced across the cluster, the shard allocation manager 156 re-calculates the median number of queries per node across the cluster as well as the standard deviation of the number of queries per node. The median number of queries per node and the standard deviation may be different than those determined at block 504 because not only are the calculations performed on different query load measurement 206 data, but the exchange of the at least one pair of shards between the hot node and the cold node affects the query load distribution across the cluster. As such, the threshold may be a different value at block 516 compared to block 504 but is determined in the same manner.

If the query load distribution is balanced across the cluster, shard movement that occurred during the cluster balancing is logged (block 518). By way of example, the execution of the dynamic shard allocation algorithm 160 is logged in the dynamic shard allocation log 214 along with an indication that the query load distribution was balanced during execution by exchanging specific shard(s) between the hot node and the cold node. Accordingly, the identity of the moved shard(s) as well as the nodes involved in the exchange are logged. In one or more implementations, the analytics and management platform 150 may further output a monitoring notification 168 indicating that the dynamic shard allocation algorithm 160 was performed as well as a result of the algorithm, e.g., that the cluster 128 was balanced and which shards were moved during the execution.

On the other hand, if the query load distribution is not yet balanced across the cluster, it is determined if a threshold number of shard moves has been reached (block 520). By way of example, a shard move refers to the exchange of one pair of shards between the hot node and the cold node. As such, the threshold number of shard moves has been reached if the threshold number of shard pairs has been exchanged in an attempt to balance the query load distribution across the cluster during a single execution of the dynamic shard allocation algorithm 160 and/or within a pre-determined time frame. The threshold number of shard moves is a pre-defined, adjustable non-zero integer value that is stored in memory. As a non-limiting example, the threshold number is in a range between 50 and 100, such as 70. Moreover, the pre-determined time frame relates to the execution frequency of the dynamic shard allocation algorithm 160. For instance, if the dynamic shard allocation algorithm 160 is executed daily, then the pre-determined time frame may be one day.

If the threshold number of shard moves has been reached, the shard movement that occurred during the cluster balancing is logged (block 518). By way of example, the execution of the dynamic shard allocation algorithm 160 is logged in the dynamic shard allocation log 214 along with an indication that the query load distribution was not balanced during execution and the identity of the moved shard(s) and the nodes involved in the exchanged. In one or more implementations, the analytics and management platform 150 may further output a monitoring notification 168 indicating that the dynamic shard allocation algorithm 160 was performed as well as a result of the algorithm, e.g., that the cluster 128 was not successfully balanced and which shards were moved during the execution.

If the threshold number of shard moves has not been reached, a hot node and a cold node of the cluster are identified based on the query load distribution (block 508). By way of example, one or both of the hot node and the cold node may have a different identity than during the previous iteration, as the previously performed shard exchange affects the query load distribution. As such, the shard allocation manager 156 continues to perform the dynamic shard allocation until the cluster 128 is considered to be balanced or the threshold number of moves is reached, at which point the dynamic shard allocation algorithm 160 terminates.

As such, the dynamic shard allocation techniques described herein enable a query load to be analyzed in real-time to identify shard moves that are predicted to bring balance to the query load distribution of the cluster 128. Notably, the dynamic shard allocation algorithm 160 does not rely on cluster-level node configurations and static criteria to categorize particular nodes as "hot," "cold," etc., which may change with changing query traffic patterns and as new indices are created. Instead, the nodes (and shards) are categorized as hot versus cold relative to each other based on the real-time query load distribution assessment. Moreover, because each shard move affects the cluster balance in a way that cannot be predicted mathematically due to, for example, adaptive replica selection that affects the query rates per shard and per node, by performing a small number of shard moves (e.g., three) at a time and reassessing the query load distribution across the cluster, cluster balancing may be efficiently achieved in a manner that is adaptable to a variety of use case scenarios. By balancing the query load distribution across the cluster by moving previously created shards between nodes, a query latency of the near real-time search platform 116 may be reduced while computing resources are used more efficiently for an overall performance enhancement of the near real-time search platform 116.

Example System and Device

Figure 6:
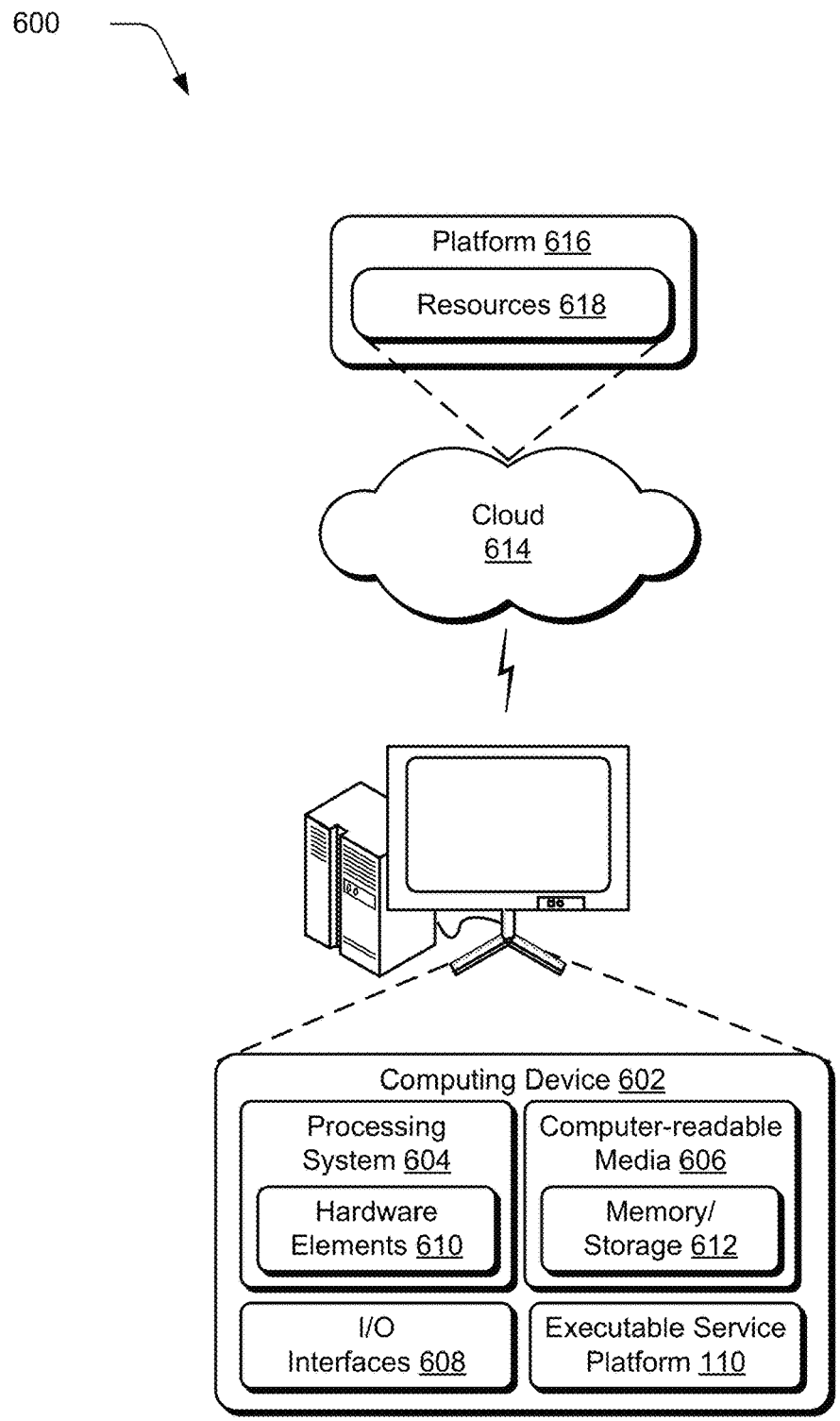
FIG. 6 illustrates an example system including various components of an example device that can be implemented as any type of computing device as described and/or utilized with reference to FIGS. 1-5 to implement embodiments of the techniques described herein.

FIG. 6 illustrates an example of a system generally at 600 that includes an example of a computing device 602 that is representative of one or more computing systems and/or devices that may implement the various techniques described herein. This is illustrated through inclusion of the executable service platform 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 606 is illustrated as including memory/storage 612. The memory/storage 612 represents memory/storage capacity associated with one or more computer-readable media. The memory/storage 612 may include volatile media (such as random-access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computing system for dynamic shard allocation, comprising:
 a cluster comprising a plurality of nodes, each node of the plurality of nodes comprising a plurality of shards storing searchable data;
 one or more processors; and
 a computer-readable storage medium storing instructions that, responsive to execution by the one or more processors, causes the one or more processors to perform operations including:
  assessing a query load distribution of the cluster in real-time;
  identifying a first shard of a first node and a second shard of a second node based on the query load distribution; and commanding the first shard of the first node to exchange with the second shard of the second node, the exchange including relocating the first shard to the second node and relocating the second shard to the first node.

2. The computing system of claim 1, wherein assessing the query load distribution of the cluster in real-time comprises measuring a number of queries per node during a defined interval.

3. The computing system of claim 2, wherein identifying the first shard of the first node and the second shard of the second node is responsive to a highest number of queries per node being greater than a median of the number of queries per node by at least a threshold value.

4. The computing system of claim 3, wherein the threshold value is equal to a standard deviation of the number of queries per node.

5. The computing system of claim 2, wherein the first node has a highest number of queries per node within the defined interval, and the second node has a lowest number of queries per node within the defined interval.

6. The computing system of claim 1, wherein identifying the first shard of the first node and the second shard of the second node based on the query load distribution comprises:
identifying the first node based on the first node receiving more queries than other nodes of the cluster within a defined interval;
identifying the first shard based on the first shard receiving more queries than other shards of the first node within the defined interval;
identifying the second node based on the second node receiving fewer queries than other nodes of the cluster within the defined interval; and
identifying the second shard based on a number of queries received by the second shard compared to other shards of the second node and an identity of the first shard.

7. The computing system of claim 6, wherein identifying the second shard based on the number of queries received by the second shard compared to the other shards of the second node and the identity of the first shard comprises selecting, as the second shard, a shard of the second node that receives a lowest number of queries that does not include a replica on the first node.

8. The computing system of claim 1, wherein commanding the first shard of the first node to exchange with the second shard of the second node comprises:
commanding first shard data to be written to the second node;
commanding second shard data to be written to the first node; and
commanding deletion of the first shard data from the first node and the second shard data from the second node after the first shard is indicated as active on the second node and the second shard is indicated as active on the first node.

9. The computing system of claim 1, wherein the computer-readable storage medium stores further instructions that, responsive to execution by the one or more processors, cause the one or more processors to perform operations including:
receiving an indication that the first node is active on the second node and the second shard is active on the first node after commanding the first shard of the first node to exchange with the second shard of the second node; and
reassessing the query load distribution of the cluster in real-time in response to receiving the indication.

10. A method for dynamic shard allocation, comprising:
assessing a query load distribution of a cluster of nodes over a pre-determined interval, nodes of the cluster of nodes comprising shards storing searchable data;
identifying at least one pair of shards to exchange between a high query load node of the cluster of nodes and a low query load node of the cluster of nodes based on the query load distribution, the at least one pair of shards including a high query load shard of the high query load node and a low query load shard of the low query load node;
exchanging the at least one pair of shards between the high query load node and the low query load node by relocating the high query load shard to the low query load node and relocating the low query load shard to the high query load node; and
reassessing the query load distribution of the cluster of nodes in real-time in response to receiving an indication that the at least one pair has been exchanged between the high query load node and the low query load node.

11. The method of claim 10, wherein identifying the at least one pair of shards to exchange between the high query load node of the cluster of nodes and the low query load node of the cluster of nodes based on the query load distribution is responsive to a highest number of queries per node being greater than a median number of queries per node during the pre-determined interval by at least a threshold value.

12. The method of claim 10, wherein the high query load node receives a highest number of queries per node during the pre-determined interval and the low query load node receives a lowest number of queries per node during the pre-determined interval.

13. The method of claim 10, wherein the high query load shard is a highest query load shard of the high query load node, and the low query load shard is a lowest query load shard of the low query load node.

14. The method of claim 13, wherein the low query load node does not include a first replica shard of the high query load shard, and the high query load node does not include a second replica shard of the low query load shard.

15. The method of claim 13, wherein the high query load shard and the low query load shard are not actively ingesting new data for storage.

16. A method for dynamic shard allocation, comprising:
assessing a query load distribution of a cluster in real-time, the cluster comprising a plurality of nodes each comprising shards storing searchable data;
determining whether the cluster is balanced based on the query load distribution;
in response to the cluster not being balanced:
identifying a high query load node and a low query load node of the plurality of nodes;
identifying a high query load shard of the high query load node and a low query load shard of the low query load node based on the query load distribution; and
exchanging the high query load shard of the high query load node with the low query load shard of the low query load node by relocating the high query load shard to the low query load node and relocating the low query load shard to the high query load node; and
in response to the cluster being balanced, generating an indication that the cluster is balanced.

17. The method of claim 16, wherein identifying the high query load node and the low query load node of the plurality of nodes is further in response to a threshold number of shard moves not being reached within a time frame.

18. The method of claim 17, further comprising generating a second indication that the cluster is imbalanced without exchanging additional shards between the plurality of nodes in response to the threshold number of shard moves being reached within the time frame.

19. The method of claim 16, wherein identifying the high query load shard of the high query load node and the low query load shard of the low query load node is further based on configuration constraints of the cluster.

20. The method of claim 19, wherein the configuration constraints of the cluster include the high query load shard of the high query load node not having a first shard replica stored on the low query load node and the low query load shard of the low query load node not having a second shard replica stored on the high query load node.

* * * * *